US 9,497,626 B2

(12) United States Patent
Case et al.

(10) Patent No.: US 9,497,626 B2
(45) Date of Patent: Nov. 15, 2016

(54) CERTIFICATE VALIDATION AND CHANNEL BINDING

(75) Inventors: Lawrence Case, Austin, TX (US);
Yogendra C. Shah, Exton, PA (US);
Inhyok Cha, Yardley, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/296,855

(22) Filed: Nov. 15, 2011

(65) Prior Publication Data

US 2012/0297473 A1 Nov. 22, 2012

Related U.S. Application Data

(60) Provisional application No. 61/430,855, filed on Jan. 7, 2011, provisional application No. 61/413,839, filed on Nov. 15, 2010.

(51) Int. Cl.
*H04L 29/06* (2006.01)
*H04W 12/06* (2009.01)
*H04L 9/32* (2006.01)

(52) U.S. Cl.
CPC ............ *H04W 12/06* (2013.01); *H04L 9/3263* (2013.01); *H04L 63/0823* (2013.01); *H04L 63/0853* (2013.01); *H04L 63/0884* (2013.01)

(58) Field of Classification Search
USPC .................... 713/168–181, 150, 155–159
See application file for complete search history.

(56) References Cited

U.S. PATENT DOCUMENTS

| | | | |
|---|---|---|---|
| 2003/0076962 A1* | 4/2003 | Roh | H04L 9/006 380/282 |
| 2003/0196084 A1* | 10/2003 | Okereke | H04L 63/0281 713/156 |
| 2003/0204741 A1* | 10/2003 | Schoen et al. | 713/200 |
| 2003/0237004 A1* | 12/2003 | Okamura | 713/201 |
| 2005/0278534 A1 | 12/2005 | Nadalin et al. | |

(Continued)

FOREIGN PATENT DOCUMENTS

| | | |
|---|---|---|
| CN | 1950776 | 4/2007 |
| CN | 101248614 | 8/2008 |

(Continued)

OTHER PUBLICATIONS

3GPP TR ab.cde, "3rd Generation Partnership Project; Technical Specification Group TSG SA; <Title 1; Title 2> Release 10", vol. SA WG3, No. Riga, Nov. 10, 2010, pp. 1-70.

(Continued)

*Primary Examiner* — Tae Kim
(74) *Attorney, Agent, or Firm* — Baker & Hostetler LLP

(57) ABSTRACT

A constrained network entity may determine, via an authentication procedure with a core network entity, the trustworthiness of an endpoint attempting to establish a secure channel with the constrained network entity. The constrained network entity may receive a certificate from the endpoint attempting to establish the secure channel and the constrained network entity may send the certificate asserted by the endpoint to a core network entity for validation. The core network entity may receive the certificate during a key exchange with the constrained network entity and the core network entity may indicate to the constrained network entity the validity of the certificate. The constrained network entity may determine whether to establish the secure channel with the endpoint based on the validity of the certificate.

20 Claims, 16 Drawing Sheets

(56) References Cited

U.S. PATENT DOCUMENTS

| | | | |
|---|---|---|---|
| 2006/0079284 A1* | 4/2006 | Lu et al. .................. | 455/558 |
| 2006/0206710 A1* | 9/2006 | Gehrmann ................ | 713/168 |
| 2006/0271785 A1* | 11/2006 | Holtmanns et al. ........ | 713/171 |
| 2007/0142086 A1* | 6/2007 | Boursier et al. ............ | 455/558 |
| 2007/0147619 A1* | 6/2007 | Bellows et al. ............ | 380/277 |
| 2008/0086634 A1* | 4/2008 | Salowey ............ | H04L 63/0892 713/156 |
| 2009/0132810 A1* | 5/2009 | Hendsbee ............ | H04L 9/3268 713/156 |
| 2009/0144541 A1* | 6/2009 | Kim .................... | H04L 63/0869 713/156 |
| 2009/0300349 A1* | 12/2009 | Hashimoto et al. ......... | 713/156 |

FOREIGN PATENT DOCUMENTS

| | | |
|---|---|---|
| EP | 1594316 | 11/2005 |
| JP | 2003-209542 | 7/2003 |
| JP | 2005-217679 | 8/2005 |

OTHER PUBLICATIONS

3GPP TS 33.102, "3rd Generation Partnership Project; Technical Specification Group Services and System Aspects; 3G Security; Security Architecture (Release 9)", No. V9.2.0, Mar. 2010, pp. 1-72.

3GPP TS 33.220, "3rd Generation Partnership Project; Technical Specification Group Services and System Aspects; Generic Authentication Architecture (GAA); Generic bootstrapping architecture (GBA) (Release 9)," No. V9.4.0, Mar. 2012, pp. 1-75.

Gemalto et al., "Relay Node Security: Profile 4A of Solution 4", 3GPP TSG-SA3#61 (Security) Draft, S3-101364 Profile 4A, vol. SA WG3, No. Sorrento, Nov. 15-19, 2010, pp. 1-3.

International Patent Application No. PCT/US2011/060769: International Search Report and Written Opinion dated Feb. 10, 2012, 13 pages.

Pinkas, D., "Delegated Path Validation and Delegated Path Discovery Protocol Requirements (DPV&DPD-REQ)", Internet Draft, <draft-ietf-pkix-dpv-dpd-req-OO.txt>, Nov. 2001, pp. 1-12.

3GPP TSG SA3, Living Document on "Key Security Issues of Relay Node Architectures", Sep. 2010, http://www.3gpp.org/ftp/tsg_ran/WG3_Iu/TSGR3_69bis/Doc_s/R3-102956, Received online: Sep. 12, 2013.

Takahiro Fujishiro, et al., "Development of Certificate Validation Service," The IEICE Transactions, vol. J87-D-I, No. 8, 833-840, Aug. 1, 2004.

Malpani, et al., "Simple Certificate Validation Protocol (SCVP)," Internet Draft, [online], Oct. 2003, retrieved on Nov. 14, 2014, http://tools.ietf.org/html/draft-ietf-pkix-scvp-13.

Japanese Patent Application No. 2013-539945: Office Action dated Nov. 25, 2014, English Translation, pp. 1-5.

China Application No. 201180054890.9: First Notification of Office Action dated Feb. 13, 2015, 10 pages.

3rd Generation Partnership Project; (3GPP) TR ab.cde Vx.y.z (yyyy-mm), S3-101106, 3rd Generation Partnership Project; Technical Specification Group TSG SA; Release 10, Oct. 2010, 19 pages.

Taiwan Application No. 100141593: Office Action dated Jun. 26, 2015, 7 pages.

Japanese Application No. 2013-539945: Appeal Decision dated Jan. 5, 2016, 1 page.

Japanese Application No. 2015-062029 : Notice of Rejection dated May 10, 2016, 7 pages.

* cited by examiner

CERTIFICATE VALIDATION AND CHANNEL BINDING

CROSS REFERENCE TO RELATED APPLICATIONS

This application claims the benefit of U.S. Provisional Patent Application Ser. No. 61/430,855, filed Jan. 7, 2011, and U.S. Provisional Patent Application Ser. No. 61/413,839, filed Nov. 15, 2010, the contents of which are hereby incorporated by reference in their entirety.

BACKGROUND

The security of a network may depend on the privacy of the communication across a channel between a constrained device and another endpoint (e.g., network encryption across the channel). Constrained network devices may be unable to perform some tasks used for securely establishing communication channels with other endpoints, as constrained networked devices may have limited resources and computational capabilities. As a result, communications with a constrained network entity may be vulnerable to eavesdropping and/or spoofing.

Similarly, in a network capable of machine-to-machine communications (M2M), the security of a network may depend on the privacy of the communication across a channel between M2M network entities. These M2M network entities may also be unable to securely perform some tasks that enable establishment of communications with one another. Thus, communications between network devices capable of performing M2M communications may also be vulnerable to eavesdropping and/or spoofing.

SUMMARY

This Summary is provided to introduce various concepts in a simplified form that are further described below the Detailed Description.

Systems, methods, and apparatus embodiments are described herein for ensuring the validity of a certificate used to establish a secure channel with a constrained network entity. According to an example embodiment, as described herein, a certificate from a network entity (e.g., relay node terminal or M2M network entity) may be received at a constrained network entity. The certificate may be received for establishing a secure channel between the constrained network entity and the network entity. The validity of the certificate may be unknown by the constrained network entity. The certificate may be sent to a core network entity to determine the validity of the certificate. An indication of the validity of the certificate may be received from the core network entity and a determination may be made whether to authenticate with the network entity based on the indication of the validity of the certificate.

According to another example embodiment, a certificate may be received from a constrained network entity. The certificate may be associated with a network entity attempting to establish a secure channel with the constrained network entity. A validity of the certificate may be determined on behalf of the constrained network entity and the validity may be indicated to the constrained network entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to in limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
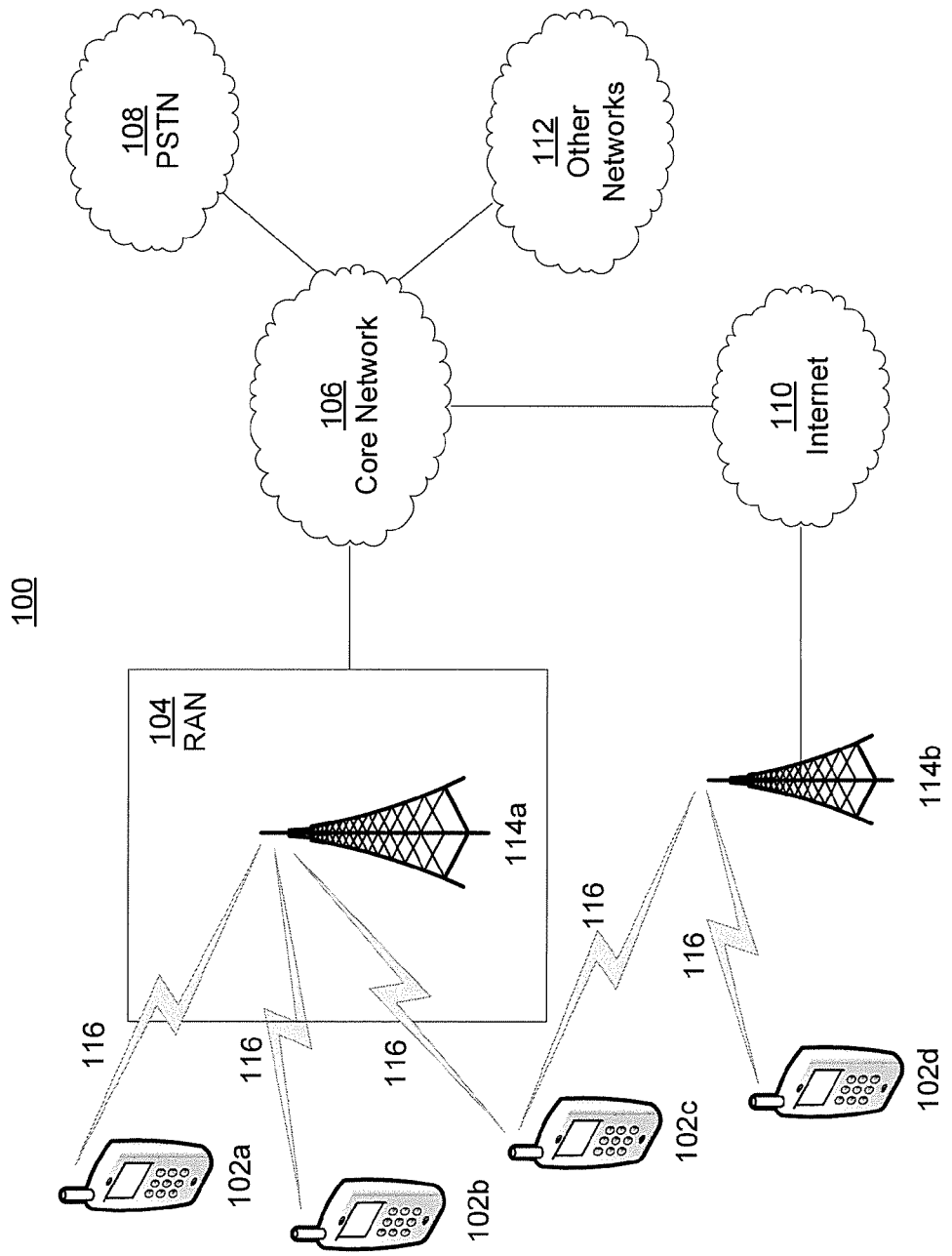
FIG. 1A is a system diagram of an example communications system in which one or more disclosed embodiments may be implemented.

Embodiments are described herein for validating a certificate associated with an endpoint (e.g., a relay, terminal, etc.) that may be used for establishing a secure channel between the endpoint and a constrained network entity (e.g., a UICC or USIM). According to an embodiment, a secure channel may be established between a constrained network entity (e.g., a UICC or USIM) and an endpoint (e.g., a relay, terminal, etc.). The constrained network entity may receive a certificate from the endpoint. The constrained network entity may send the certificate asserted by the endpoint to a core network entity to validate the asserted certificate. The endpoint with which the constrained network entity may establish, or attempt to establish, a secure channel may include a terminal, a relay node (RN) or RN platform, an M2M network entity, or another network entity for example.

System, method, and apparatus embodiments are described herein for ensuring the validity of a certificate used to authenticate and/or establish a secure channel with a constrained network entity. According to an example embodiment, as described herein, a certificate may be received from a network entity (e.g., a terminal or M2M network entity) at a constrained network entity. The network entity may include a terminal (e.g., mobile device, relay node, etc.), an M2M device, or other network entity attempting to establish a secure channel with the constrained network entity for example. The certificate may be received for authenticating and establishing a secure channel between the constrained network entity and the network entity. The validity of the network entity's certificate may be unknown by the constrained network entity. The network entity's certificate may be sent to a trusted core network entity, by the constrained network entity, to determine the validity of the certificate. An indication of the validity of the network entity's certificate may be received from the core network entity. The validity of the network entity's certificate may be based on the authenticity of the certificate and thus the information contained therein including the authentication key. The constrained network entity may then determine whether to authenticate and (optionally) establish a secure channel with the network entity based on the indication of the validity of the certificate. Authentication and/or secure channel establishment may be performed with the network entity using the certificate and the authentication key provided in the certificate.

According to another example embodiment, an authentication key and an identity associated with a terminal may be securely received by a constrained network entity, from a trusted network entity. The constrained network entity may be attempting to authenticate and establish a secure channel with a network entity (e.g., terminal or M2M device). The validity of the authentication key and identity for the terminal may be assured by the trusted network entity from which the information is received for example.

As described herein, the network may serve as a proxy for certificate validation for a constrained network entity having limited resources and/or access to or within the core network. A core network entity may validate the asserted certificate. For example, the constrained network entity may send an identity of the terminal to the core network entity. The core network entity may use the identity of the terminal to obtain a valid certificate associated with the terminal. The core network entity may derive an encryption and/or authentication key using the validated certificate.

The core network entity may determine a validity status of the asserted certificate. For example, the core network entity may determine that the asserted certificate associated with the terminal is valid or is not valid. The network entity may send the validity status to the constrained network entity. If the asserted certificate is valid, the constrained network entity may perform authentication, relying on the network entity's determination that the asserted certificate is valid. If the asserted certificate is invalid, the constrained network entity may refrain from performing authentication with the terminal, relying on the network entity's determination that the asserted certificate is invalid.

Figure 1B:
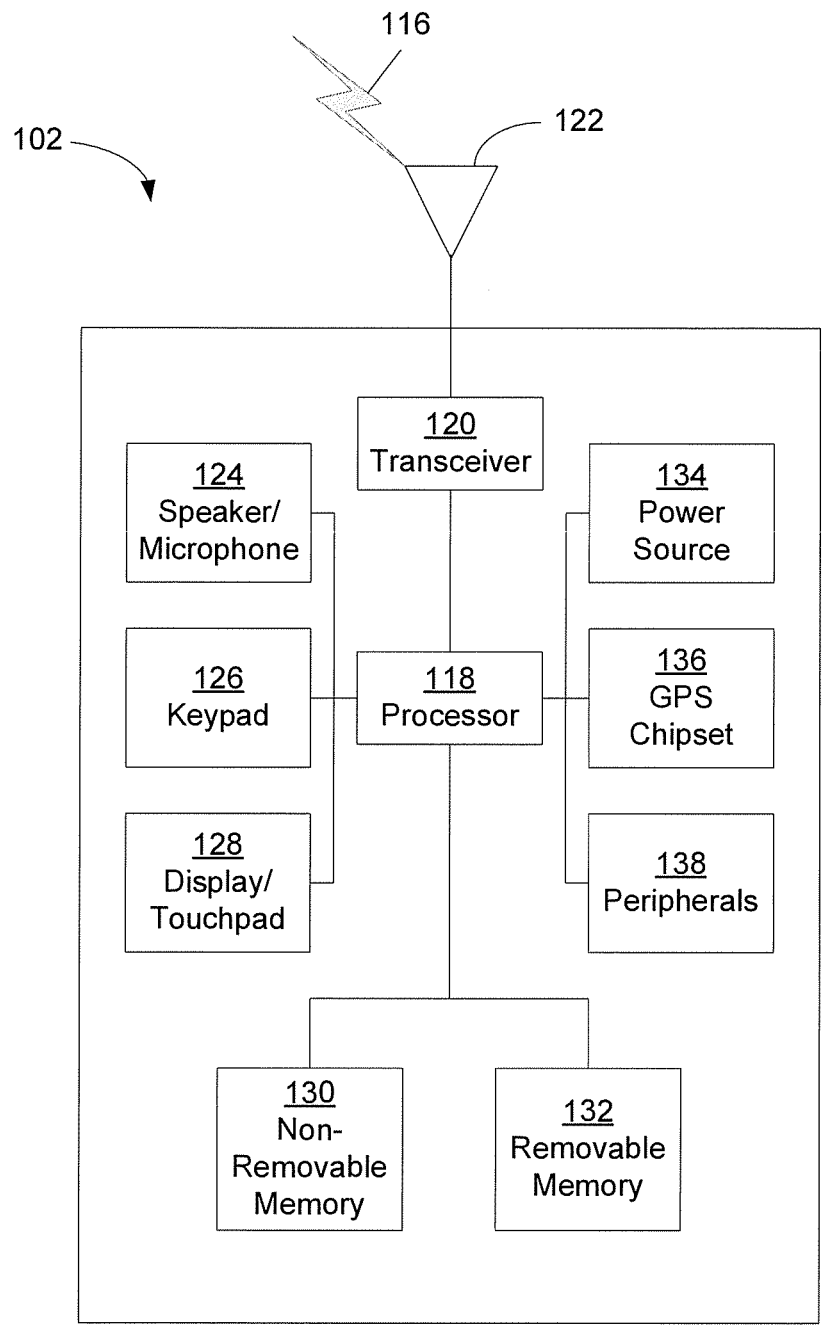
FIG. 1B is a system diagram of an example wireless transmit/receive unit (WTRU) that may be used within the communications system illustrated in FIG. 1A.
Figure 1C:
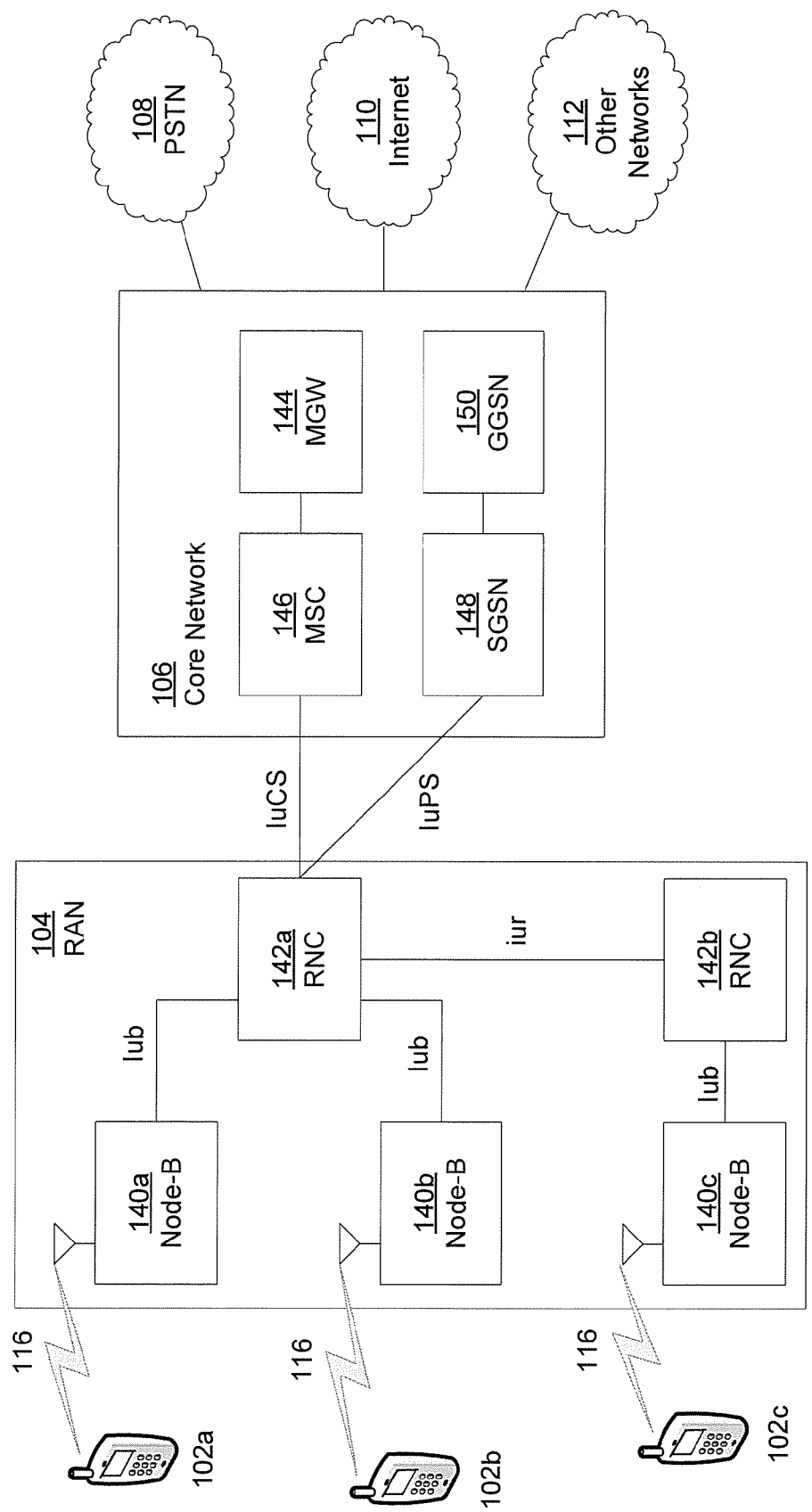
FIG. 1C is a system diagram of an example radio access network and an example core network that may be used within the communications system illustrated in FIG. 1A.

FIGS. 1A, 1B, and 1C illustrate example communication environments that may be implemented in performing the embodiments described herein. FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA20001x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, femto cell base station, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip. The processor 118 may perform application-layer programs (e.g., browsers) and/or radio access-layer (RAN) programs and/or communications. The processor 118 may perform security operations such as authentication, security key agreement, and/or cryptographic operations, such as at the access-layer and/or application layer for example.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
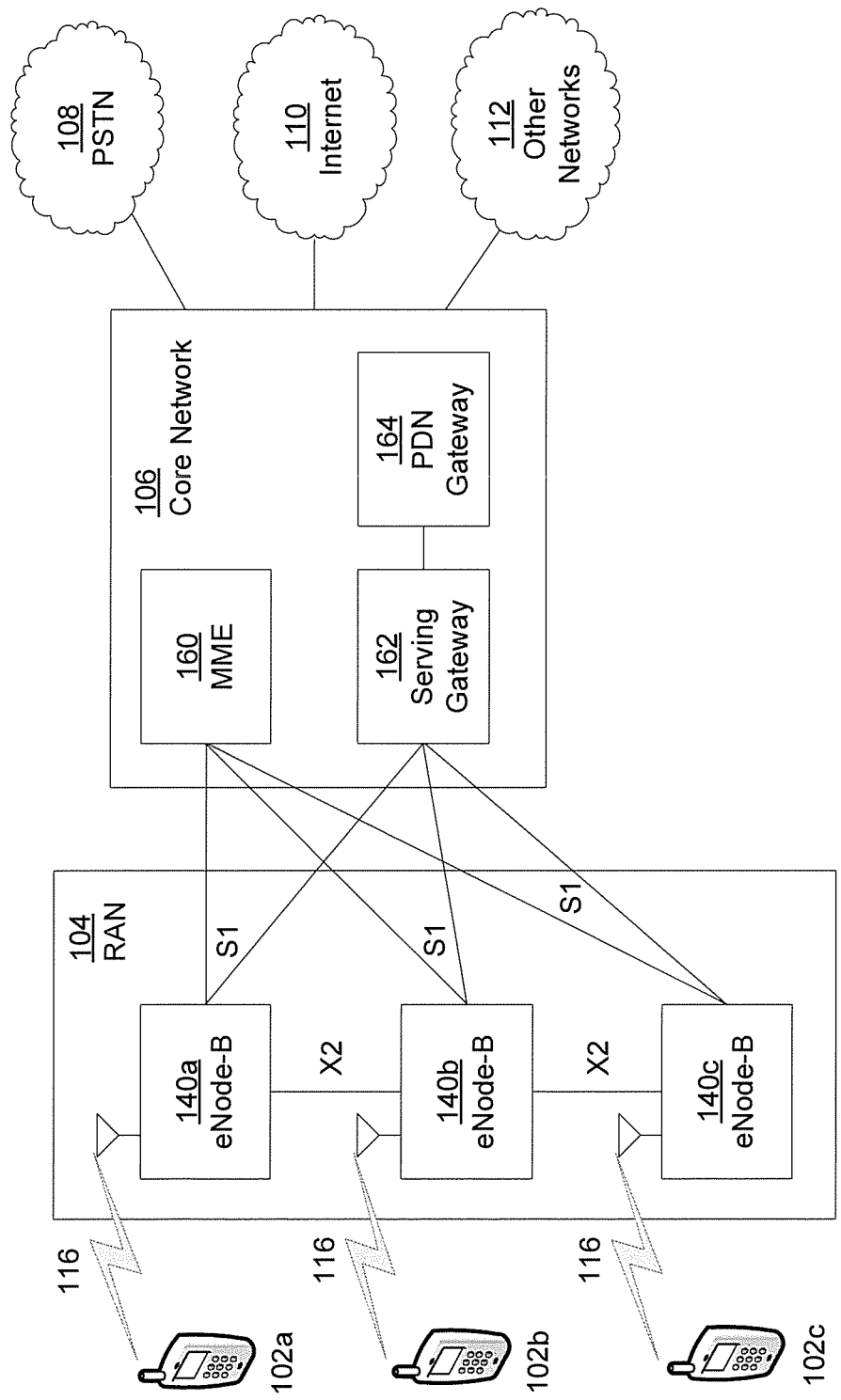
FIG. 1D is a system diagram of another example radio access network and example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1D, the eNode-Bs 140*a*, 140*b*, 140*c* may communicate with one another over an X2 interface.

The core network 106 shown in FIG. 1D may include a mobility management gateway (MME) 160, a serving gateway 162, and a packet data network (PDN) gateway 164. While each of the foregoing elements are depicted as part of the core network 106, it will be appreciated that any one of these elements may be owned and/or operated by an entity other than the core network operator.

The MME 160 may be connected to each of the eNode-Bs 142*a*, 142*b*, 142*c* in the RAN 104 via an S1 interface and may serve as a control node. For example, the MME 160 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 160 may also provide a control plane function for switching between the RAN 104 and other RANs (not shown) that employ other radio technologies, such as GSM or WCDMA.

The serving gateway 162 may be connected to each of the eNode Bs 140*a*, 140*b*, 140*c* in the RAN 104 via the S1 interface. The serving gateway 162 may generally route and forward user data packets to/from the WTRUs 102*a*, 102*b*, 102*c*. The serving gateway 162 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 162 may also be connected to the PDN gateway 164, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

The aforementioned communication system and/or systems may be used to validate a certificate from an end point (e.g., relay node, terminal, etc.) as described herein. Disclosed herein are systems, methods, and/or instrumentalities that may establish a secure channel between endpoints. Each endpoint may include a constrained network entity (e.g., a USIM or UICC), a terminal (e.g., a relay node), secure and/or isolated domains within a device, or other endpoints for example. According to an embodiment, a core network entity may be utilized as a certificate validation proxy for the constrained network entity. A secure channel may be established by the network authenticating a certificate to be used by the constrained network entity. The certificate used by the constrained network entity may be obtained from an endpoint (e.g. terminal, relay node, etc.) or a trusted source.

The security of a network may depend on the privacy of the communication across a channel between the constrained network entity and another endpoint, such as a terminal for example. The channel between the constrained network entity and the terminal may be used to transfer network encryption and/or authentication keys. Such may be the case, for example, in LTE-advance relay nodes where a UICC is connected to an RN platform. For example, UICC-to-RN platform communication may be vulnerable to eavesdropping. However, it is across this channel that encryption and/or authentication keys may be transferred. A rogue device may be able to read these keys and thus spoof the genuine device in the authentication sequence and/or eavesdrop on conversations. The UICC may create a secure channel with the RN platform through a public key exchange. The public keys may be signed using certificates provided by the UICC and/or the RN platform. The RN platform may assume that the certificate received from the UICC is trustworthy or may be able to validate the certificate, but the UICC may have no way to validate the certificate provided by the RN platform.

The asserted certificate of the terminal (e.g., relay node) platform and/or the validity of the certificate may be incorporated into the UICC-to-network authentication procedure so that authentication may occur when certificate validation occurs. The network may know by use of a valid certificate that the secure channel is not compromised and therefore the encryption and/or authentication keys are not compromised. This may be done in the same procedure for example. If the terminal platform is using an invalid certificate (e.g., a spoofing RN platform is compromising the encryption and/or authentication keys) then the network authentication may fail. The authentication with the network may facilitate relaying of the validity status of the certificate back to the constrained network entity (e.g., UICC) and then the secure channel may be setup.

The implicit trust between a constrained network entity (e.g., UICC) and a core network may be used to allow the core network to serve as a proxy to the constrained entity to validate a certificate. For example, a secure channel between the constrained network entity and another endpoint, such as a terminal, across an otherwise vulnerable channel may be established without the constrained network entity performing validity of the certificate and/or checking for revocation status with an OCSP.

The secure channel between a constrained network entity and the terminal may be validated using an authentication procedure between the constrained network entity and the core network. Public keys for asymmetric authentication that use validation may be included as parameters in a shared authentication sequence. The systems, methods, and instrumentalities described herein may be applied to devices, such as relay nodes for example, where a constrained network entity (e.g., UICC) and an endpoint (e.g., RN platform) communicate network encryption and/or authentication keys across a vulnerable channel. The constrained network entity and endpoint may therefore establish a secure channel.

According to an embodiment, the validity of an endpoint or relay certificate may be assumed. According to another embodiment, the constrained network entity (e.g., UICC) may validate the certificate within the constrained network entity. In yet another embodiment, the constrained network entity may validate the certificate within a separate validation request exchange between the constrained network entity and the core network, as described herein.

To validate the certificate using the core network, the constrained network entity (e.g., UICC) and a core network entity may establish a security association, such as an AKA based Security Association (SA) for example. Another endpoint, such as a terminal for example, and the constrained network entity may attempt to set up a Master SA to establish a TLS secure channel using certificates. The terminal and constrained network entity may exchange certificates. The constrained network entity may perform, via the terminal, an AKA to the core network. The constrained network entity may request a signed valid terminal certificate from the terminal. The core network entity may receive the constrained network entity forwarded terminal certificate, which may be signed for example. The core network entity may validate the certificate. For example, the core network entity may validate the certificate through an OCSP or CRL. The core network entity may also send and/or receive the revocation status of the certificate. The core network entity may encrypt the actual status of the terminal certificate and/or send the status of the terminal certificate to the constrained network entity. According to an example embodiment, the constrained network entity may include a UICC TLS endpoint app. If the status of the certificate is indicated by the core network entity as being invalid, the constrained network entity and/or core network entity may remove the AKA security context. The disclosed systems, methods, and instrumentalities may ensure that the AKA sequence fails if the terminal's certificate is invalid. Another certificate validation transaction between the constrained network entity and the core network may not be performed.

Figure 2:
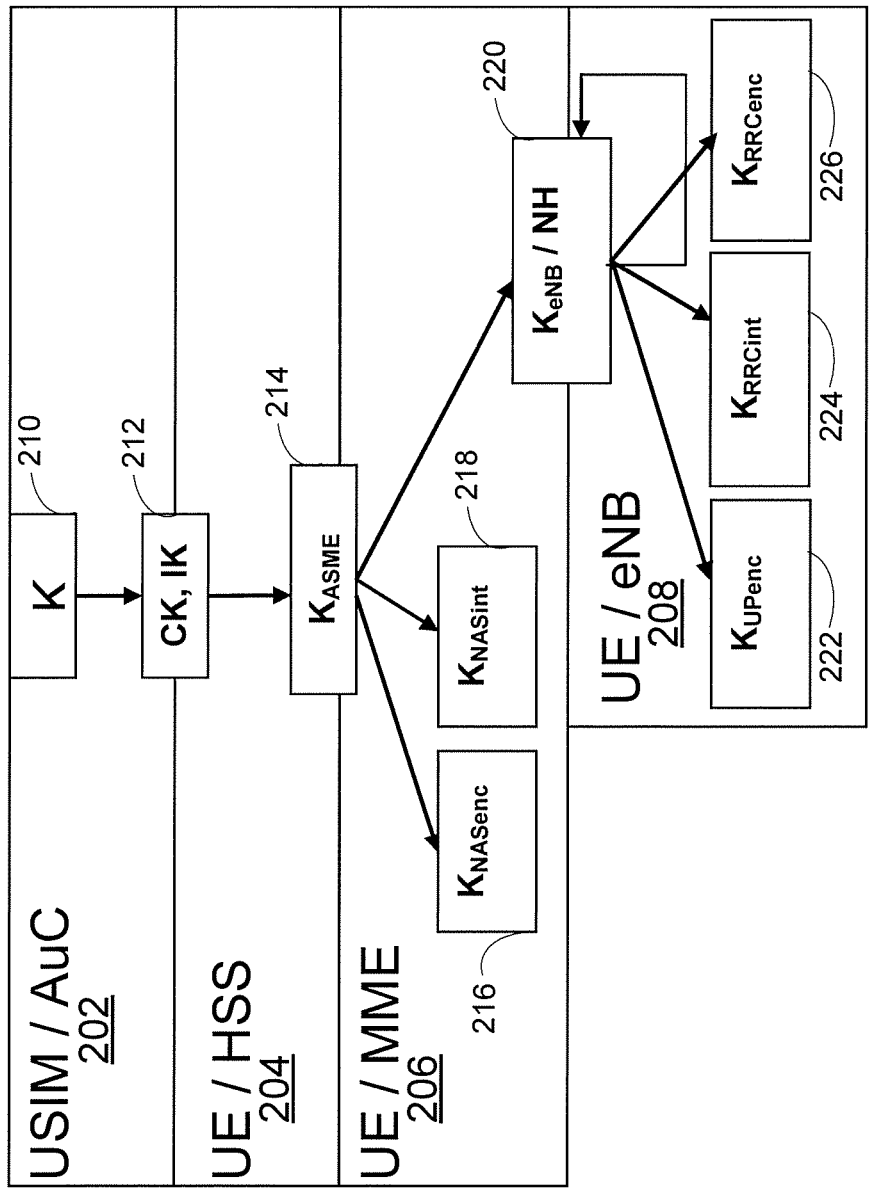
FIG. 2 is a diagram illustrating $K_{ASME}$ being derived in the user equipment (UE)

FIG. 2 is a diagram illustrating a key generation and hierarchy. For example, the key generation and hierarchy may be used for 3GPP eNBs. As shown in FIG. 2, K 210 may be a permanent key stored on the USIM and/or Authentication Centre AuC 202. The USIM may be implemented on a UICC for example. CK, IK 212 may be a pair of keys derived in the USIM and/or Authentication Centre AuC 202 during an AKA procedure. CK, IK 212 may be used to compute the Key Access Security Management Entity ($K_{ASME}$) 214. $K_{ASME}$ 214 may be generated on the HSS and/or UE 204. $K_{ASME}$ 214 may be used to create the NAS encryption key ($K_{NASenc}$) 216, integrity key ($K_{NASint}$) 218, and/or eNB key ($K_{eNB}$) 220. $K_{eNB}$ 220 may be a key derived by UE and/or MME 206 and used on the UE and/or eNB 208 to create UP encryption key ($K_{UPenc}$) 222, RRC integrity key ($K_{RRCint}$) 224, and/or RRC encryption key ($K_{RRCenc}$) 226. $K_{eNB}$ 220 may also be used on the UE and/or eNB 208 to create other keys, such as a UP integrity key ($K_{UPint}$) (not shown) for example. $K_{UPint}$ may be a key used for the protection of UP traffic between RN and DeNB with an integrity algorithm.

As described herein, a constrained network entity (e.g., a UICC) may validate a certificate of a terminal (e.g., a relay node). The terminal may be an endpoint of a secure channel associated with the constrained network entity. The certificate may be validated through an authentication procedure with another endpoint that is not constrained (e.g., a core network entity). The systems, methods, and instrumentalities described herein may be used to bind secure channels of at least one level.

Figure 3:
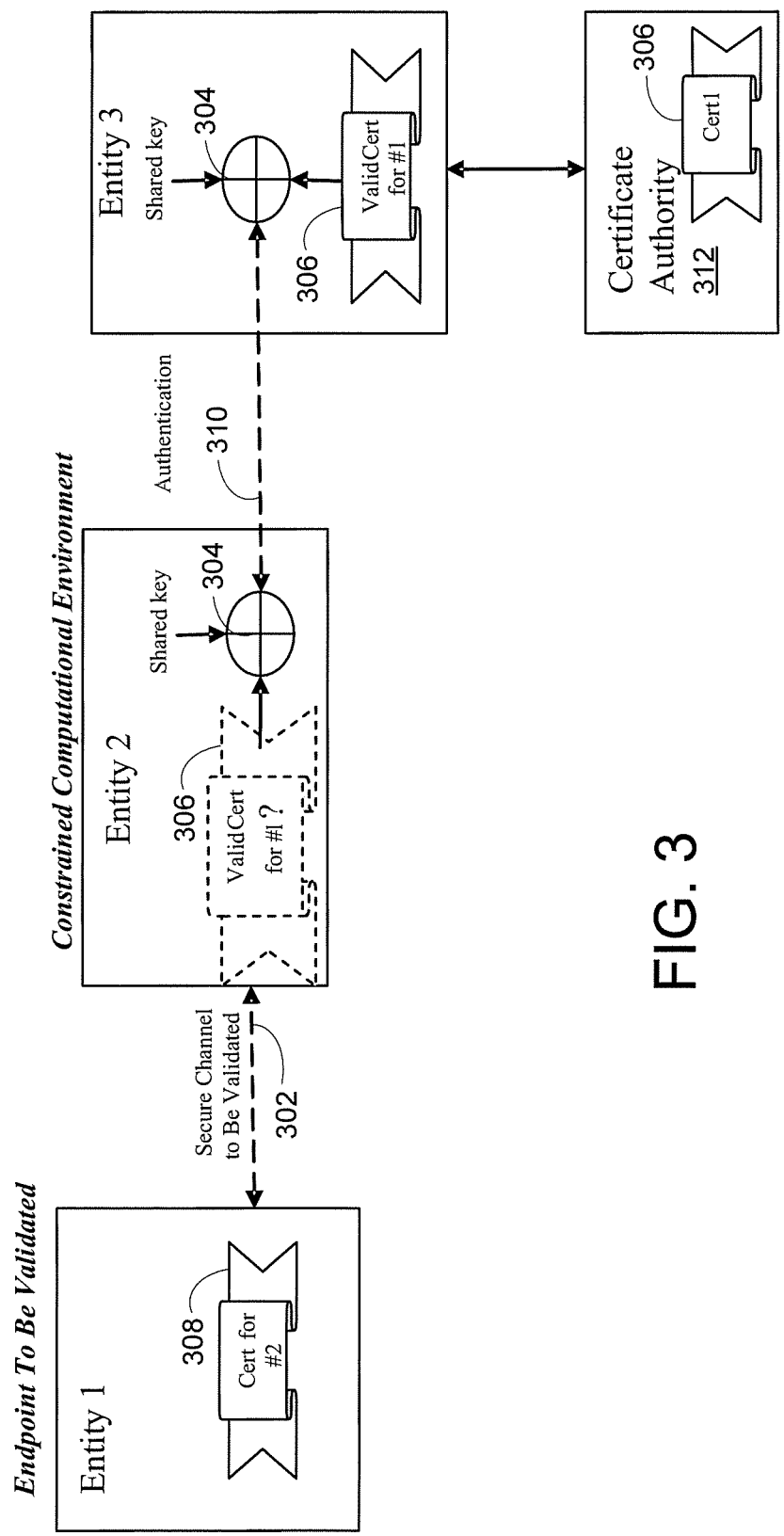
FIG. 3 is a diagram illustrating an exemplary certificate validation using network authentication.

FIG. 3 illustrates an example of certificate validation using network authentication. As illustrated in FIG. 3, Entity 2 may be a constrained entity that uses a network entity, such as Entity 3 for example, to validate a secure channel certificate received from Entity 1. According to one example embodiment, Entity 1 may be a terminal (e.g., relay node), Entity 2 may be a constrained network entity (e.g., a USIM or a UICC), and/or Entity 3 may be a non-constrained core network entity. As illustrated in FIG. 3, Entity 1 and Entity 2 may establish, or attempt to establish, a secure channel at 302. In establishing the secure channel at 302, Entity 1 and Entity 2 may perform a public key exchange. Along with the exchange of public keys, Entity 1 may receive Entity 2's certificate 308 and Entity 2 may receive Entity 1's certificate 306. Entity 2 may be unsure whether certificate 306 is a valid certificate. To determine the validity of Entity 1's certificate 306, Entity 2 may use Entity 3 as a proxy to validate the certificate 306.

To validate Entity 1's certificate 306, Entity 2 and Entity 3 may perform a key exchange during authentication at 310. In performing authentication, Entity 2 and Entity 3 may exchange the shared key 304, which may be derived from the same public key used to establish the secure channel at 302 between Entity 1 and Entity 2. During authentication at 310, Entity 3 may receive a subscription identity associated with Entity 1 and/or Entity 2 and use the subscription identity to look up the corresponding channel public key for Entity 2. Entity 3 may obtain the latest valid certificate for Entity 1 and/or the corresponding public key, based on the subscription identity associated with Entity 1 and/or Entity 2, and validate the certificate 306. For example, Entity 3 may validate certificate 306 using certificate authority 312. If the certificate 306 is valid, Entity 3 may indicate the validity to Entity 2. For example, if the certificate 306 is valid, Entity 3 may continue and/or complete authentication at 310 with Entity 2. If the certificate 306 is invalid, then the Entity 3 may terminate authentication at 310 (e.g., deny the authentication request from Entity 2).

An example embodiment is described herein for performing validation, as illustrated in FIG. 3, using a terminal's secure channel certificate and a non-constrained network entity as a proxy for the certificate validation process. The constrained network entity may use the public key of the terminal for establishing the secure channel. The constrained network entity may not know if the certificate for the public key is valid (e.g., not revoked). The constrained network entity, which may be implicitly trusted, may use the same public key, used for establishing the secure channel, as a public authenticating parameter in the derivation of the encryption and/or authentication key to the network. The core network (e.g., operator network) may use this public authenticating parameter, which may be found in a database that corresponds to the constrained network entity's subscription identity to which the terminal may be bound.

Certificate validation and secure channel binding to network authentication may be combined, as described herein. Secure channel binding may be used when there is a threat of keys being exposed in the communications link between the constrained network entity (e.g., UICC) and the terminal. As an example embodiment, the trust within a constrained network entity (e.g., UICC) may be utilized to insert the terminal's claimed public key into the key derivation parameters for 3GPP AKA procedures. The terminal public key may be disclosed publicly and therefore may not be a secret. The terminal key may be combined with the constrained network entity secret and constrained network entity trusted process to ensure that the public key used for secure channel establishment between the constrained network entity and the terminal is the same public key used in the constrained network entity AKA key derivation.

The core network may receive a subscription identity for the constrained network entity and use that to look up the corresponding terminal's secure channel public key. The core network, with its resources, may be able to obtain the latest, unrevoked terminal certificate and corresponding public key based on the subscription identity for the constrained network entity and confirm validity of the terminal certificate. The constrained network entity may provide the core network with the terminal certificate. That public key may be used to derive the AKA key at the core network. If the certificate is valid and the terminal public key on the constrained network entity and core network match, then the derived AKA keys may match for subsequent NAS and/or AS level authentications. If the constrained network entity was given an invalid terminal certificate, then the AKA keys may not match those of the core network, and, subsequent NAS and/or AS level authentications may fail.

The constrained network entity (e.g., UICC) and the terminal may initially establish a tentative secure channel, which may be established by exchanging certificates and using a public key exchange algorithm to establish an encrypted communication link between the constrained network entity and the terminal. The constrained network entity may include a public key TpuK of the terminal (or hash of the public key, or hash of the certificate for example) in parameters sent to the core network and used for the derivation of the $K_{ASME}$ authentication key for the constrained network entity to authenticate to the core network. The constrained network entity and the terminal unit may authenticate to the network first with an identifier of the constrained network entity. For example, if the constrained network entity includes a UICC, the identifier of the constrained network entity may be an IMSI or TIMSI. The network (e.g., AAA) may reference the identifier in its database of legitimate subscriptions and/or reference the accompanying terminal certificate. The network may use a certificate authority (CA) 312 to ensure that the terminal's certificate is valid. If the terminal's certificate is valid, the network may use the terminal certificate public key TpuK (or hash of the public key, or hash of the certificate for example) in the parameters sent to the constrained network entity and used for the derivation of the encryption and/or authentication keys. If the terminal certificate is invalid, then the network may deny the authentication request with the constrained network entity and/or terminal. According to another embodiment, the network may use the invalid, but last known good public key value for the terminal, and limit access of the terminal and/or constrained network entity until the secure channel asymmetric key pair associated with the terminal and/or constrained network entity is updated. The constrained network entity and the core network may have matching keys at this point, since the parameters used in the derivation of the keys may be the same, including the terminal's public key parameter. If the terminal attempts to use the wrong public key (which may be used to authenticate and establish a corresponding SA with the constrained network entity; and may be used to establish a corresponding private key on the terminal for example), then the constrained network entity and core network keys may not match and network authentication may fail.

According to an example embodiment, the constrained network entity may assume that the terminal certificate is valid. In another embodiment, the constrained network entity may validate the certificate within the constrained network entity capability or within a separate validation request exchange between the constrained network entity and the core network. According to another example embodiment, as described herein, a computationally rich network entity may validate a secure channel certificate on behalf of the constrained network entity. The constrained network entity may be a secure channel endpoint which may be computationally constrained. The constrained network entity may be removable (e.g., easily detached and/or replaced) from a device. The secure channel certificate may be validated through authentication between the network and constrained network entity. This may bind the secure channel certificate and/or shared secret with the other end point for example. If the network depends on the validity of the secure channel and/or trust in the terminal, the authentication procedure between the constrained network entity and the core network may provide implicit assurance that the secure channel and/or the endpoints of the secure channel may protect the secrets it transports. For example, the secrets transported may be the secrets that allow an LTE relay to securely communicate with the network.

According to one example, the terminal may be an endpoint of a secure channel. The validation of the secure channel certificate may occur through an authentication procedure with another endpoint, such as an endpoint that is not constrained for example. This validation of the secure channel certificate may be used to bind, such as in an authentication procedure for example, the secure channel(s) of one layer (e.g., access layer) and/or domain to another layer (e.g., transport or application layer) and/or domain.

Figure 4:
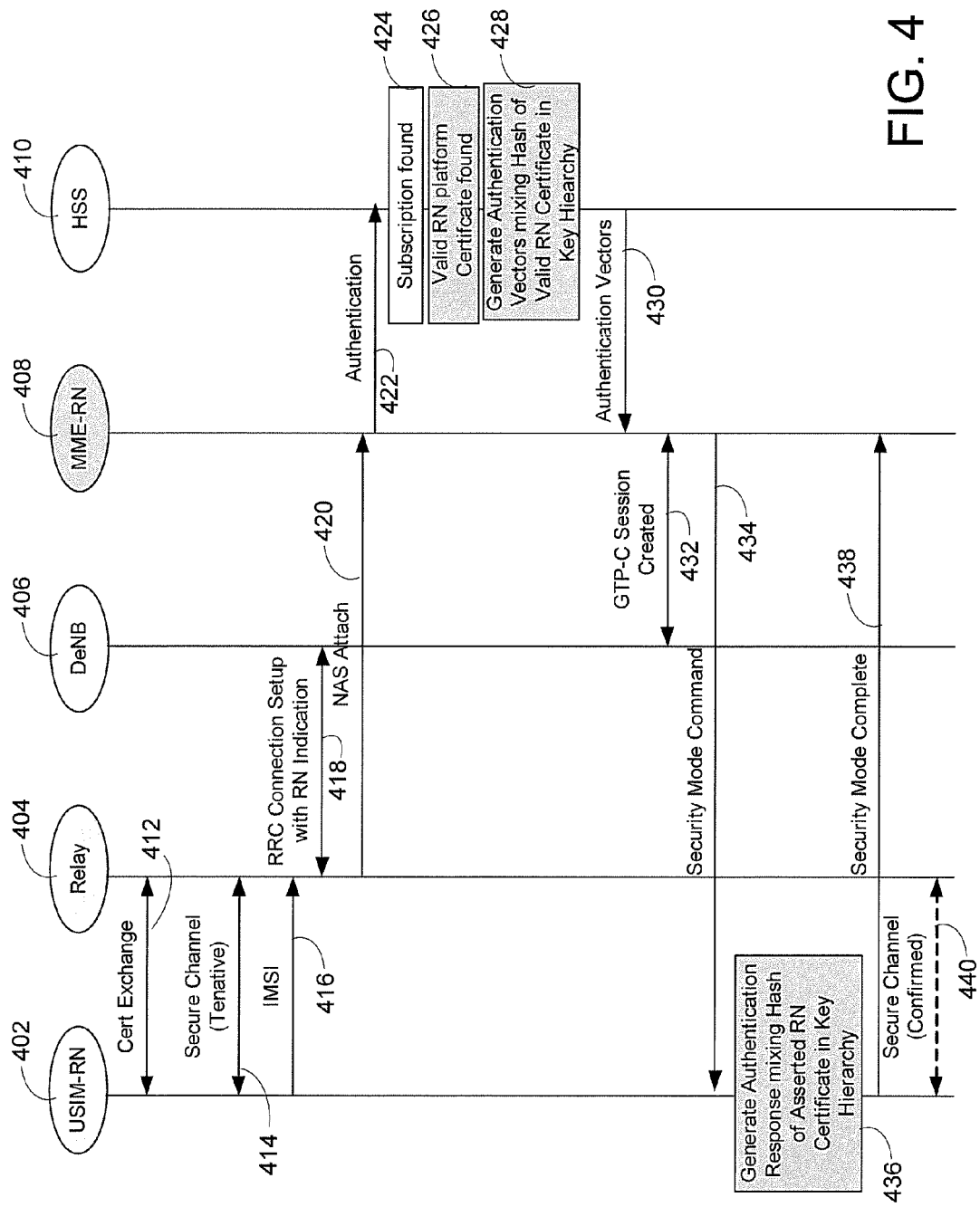
FIG. 4 is a diagram illustrating a phase 2 relay node start up procedure with implicit secure channel certificate validation and platform binding.

An exemplary form of authentication described herein is a terminal (e.g., relay node) authentication with implicit secure channel certificate validation. FIG. 4 is a diagram illustrating a phase two relay node start up procedure with implicit secure channel certificate validation and platform binding. As illustrated in FIG. 4, USIM-RN 402 may perform a certificate exchange at 412 with relay 404. At 414, the secure channel between the USIM-RN 402 and the relay 404 may be tentatively established, as USIM-RN 402 may be unsure that the certificate received from relay 404 is valid. As a result, USIM-RN 402 may use the network to validate the certificate received from relay 404. For example, at 416 USIM-RN 402 may send a subscription identifier (e.g., IMSI) to relay 404 for forwarding to the network. Relay 404 may set up a connection (e.g., RRC connection) with DeNB 406 at 418. The connection established at 418 may include RN indication. At 420, relay 404 may attach to MME-RN 408. MME-RN 408 may send an authentication request to HSS 410 at 422. The authentication request at 422 may include the subscription identity (e.g., IMSI) for example. At 424, HSS 410 may find the subscription associated with relay 404 and/or USIM-RN 402 using the subscription identity (e.g., IMSI) for example. HSS 410 may determine that the relay 404 certificate is valid at 426. At 428, HSS 410 may generate authentication vectors that mix the hash of the valid relay 404 certificate in the key hierarchy. The authentication vectors may be sent from HSS 410 to MME-RN 408 at 430. At 432, a session (e.g., GTP-C session) may be created between DeNB 406 and MME-RN 408. MME-RN 408 may send a security mode command at 434 to USIM-RN 402. USIM-RN 402 may generate an authentication response at 436. For example, the authentication response may be generated by mixing the hash of asserted relay 404 certificate in a key hierarchy. At 438, USIM-RN 402 may send an indication to MME-RN 408 that the security mode is complete. At 440 the secure channel between the USIM-RN 402 and relay 404 may be confirmed.

According to an example embodiment, key derivation may be performed. For example, the HSS 410 may be loaded with a 128-bit cryptographic hash of the relay 404 certificate. This hash may be added to the anonymity key for example by the function of bit-wise exclusive OR and may be stored for retrieval before the authentication vectors are calculated by the HSS 410 at 428 and/or sent to the MME-RN 408 at 430 (such as when the relay 404 is connecting to the network for example).

Figure 5:
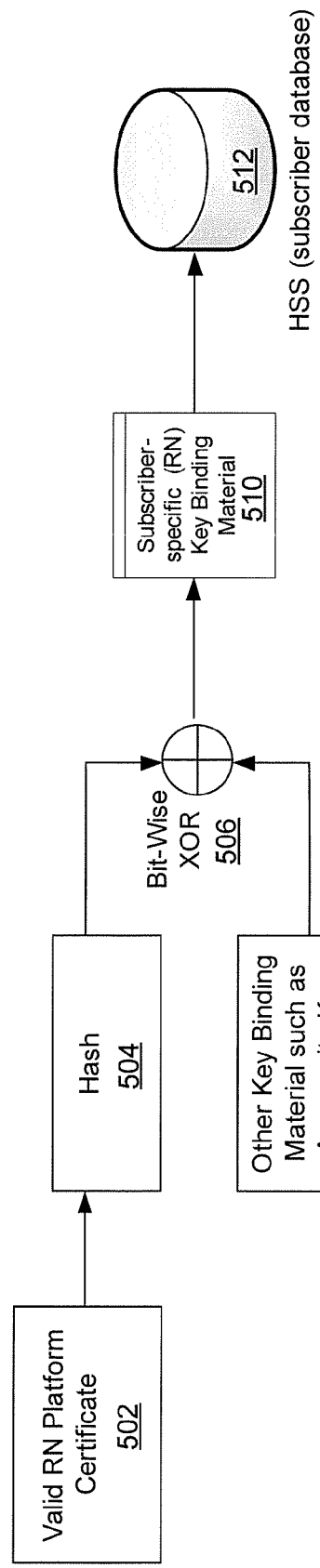
FIG. 5 is a diagram illustrating the processing and insertion of a dependent secure channel certificate into an authentication server database.

FIG. 5 is a diagram illustrating the processing and insertion of a dependent secure channel certificate into an authentication server database. As illustrated in FIG. 5, a hash function may be performed on a valid RN platform certificate 502, which may return a hash 504. The hash may be added to other key binding material (e.g., anonymity key) 508 using the bit-wise exclusive OR 506. The result may be a subscriber-specific RN key binding material 510 that may be stored at the HSS in a subscriber database 512.

Secure channel certificate enrollment may be performed, as described herein for example. The terminal (e.g., the other endpoint of the secure channel) may ensure that its secure channel certificate is updated for the constrained network entity and network authentication to succeed. The terminal may have a means to acquire and/or store a valid secure channel certificate. The secure channel certificate may be enrolled in the network database server.

The secure channel certificate may be provisioned on the terminal at the time of manufacturing. The secure channel certificate may be subsequently enrolled in the network with the terminal deployed or activated for this purpose. According to an embodiment, the terminal may authenticate to a certificate server directly.

In relay nodes, the terminal may include the relay node platform. The relay node platform may have an IP-based connection to the network after it authenticates to the network as a UE (e.g., as an RN). This UE authentication may allow the network to give the RN limited access to network elements such as an operation, administration, and maintenance (OAM). The OAM and UE persona of the relay may mutually authenticate. The relay node may provide the OAM a self-generated secure channel certificate and/or corresponding public key, and store the private key in its secure environment. Alternatively, or additionally, the RN may authenticate directly with a registration authority (RA) for certificate enrollment. The use of a secret key for authentication purposes between the network enrollment element and relay to enroll the secure channel certificate may be controlled by the secure environment and/or unavailable if the relay node platform is compromised.

Figure 6:
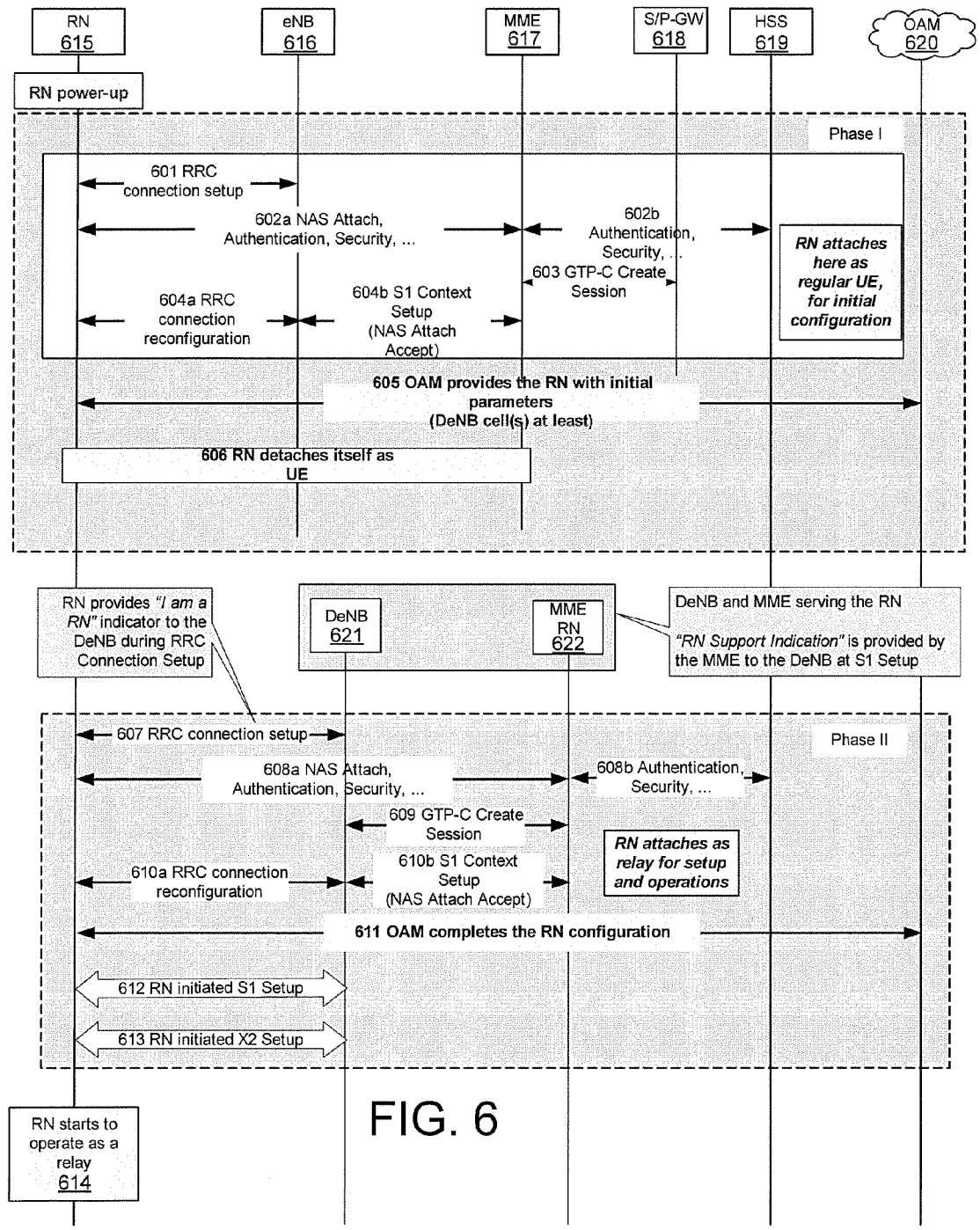
FIG. 6 is a diagram illustrating a startup sequence for relays.

FIG. 6 is a diagram illustrating an example start-up sequence for relays. As illustrated in FIG. 6, an RN 615 may start up using a procedure or phases. The first phase of startup is illustrated at 601-606. For example, the RN 615 may attach to the HSS 619 as a UE for initial configuration. After RN 615 powers up, RN 615 and eNB 616 may set up a connection (e.g., RRC connection) at 601. At 602*a* RN 615 may attach to MME 617 and/or exchange authentication and security information. At 602*b*, MME 617 may forward the authentication and security information associated with RN 615 to HSS 619. At 603, MME 617 and S/P-GW 618 may create a session (e.g. a GTP-C session) between them. The RN 615 and eNB 616 may reconfigure their connection (e.g., RRC connection) at 604*a*. At 604*b*, eNB 616 and MME 617 may set up an S1 context and attachment may be accepted. After attachment, OAM 620 may provide the RN 615 with initial parameters for authentication and/or certificate validation at 605. The initial parameters may be associated with DeNB 621 for example. The RN 615 may detach itself as a UE at 606.

The implicit certificate validation may occur during authentication in the second phase of startup, as illustrated at 607-613 for example. At 607, RN 615 may set up a connection (e.g., RRC connection) with DeNB 621. During connection setup, the RN 615 may indicate to the DeNB 621 that RN 615 is in fact an RN. At 608*a*, RN 615 may attach to MME RN 622 and provide authentication and security information. MME 617 and MME RN 622 may be the same or different network entities for example. The RN 615 may attach as a relay. MME RN 622 may send the authentication and security information to HSS 619 at 608*b*. At 609, DeNB 621 and MME RN 622 may create a session (e.g., GTP-C session) between them. RN 615 and DeNB 621 may reconfigure the connection (e.g., RRC connection) between them at 610*a*. At 610*b*, DeNB 621 and MME RN 622 may set up an S1 context and NAS attachment may be accepted. After attachment, OAM 620 may complete the RN configuration with RN 615 at 611. RN 615 and DeNB 621 may initiate S1 setup at 612 and X2 setup at 613. At 614 RN 615 may begin operating as a relay.

If the authentication, illustrated in FIG. 6 fails, then the RN 615 may return to 605 and/or request a certificate from the management entity. Therefore, step 605 may include secure channel certificate validation and/or enrollment. The secure channel certificate may be exchanged with the RN 615 platform's UICC and/or a secure channel may be established prior to passing secret keys across the UICC-RN interface in the phase two authentication procedure. The phase two authentication procedure may be the same as, or similar to, the procedure illustrated in FIG. 4 (but without the key derivation for example).

Secure channel certificate updates may be performed. When the secure channel certificate is updated, the subscriber database may be updated, such as with the hashed certificate value for example. If the constrained network entity is active when the certificate is updated then the network may initiate another authentication procedure with the constrained network entity. If the AKA fails then the RN platform may update its certificate.

Secure channel certificate generation may be performed through remote provisioning. The RN platform may install a private key for the secure channel authentication. This procedure may be accomplished in a secure manner. The public/private key pair may be generated on the RN platform and/or the private key may be provisioned securely on the RN platform.

The secure environment may be available for installation of the secure channel private key. For example, the secure environment may be available for installation of the secure channel private key if the environment is properly established. This may be detected and/or enforced through techniques in the secure boot process. For example, a manufacturer-installed RN platform secret may become available if the RN platform has securely booted and/or integrity validation checks pass. The RN platform may generate the secure channel key pair and/or encrypt the private key with a secure environment cryptographic key protected by the establishment of the secure environment. This may mean that the secure environment cryptographic key may not be available if the secure environment of the RN platform is not successfully established.

A corresponding certificate may be generated with the aid of a network entity such as a certificate authority. Through the channel established, such as is illustrated at 722-732 of FIG. 7 for example, the RN platform may send the certificate to the enrollment entity such as an RA and/or OAM. The enrollment entity may be able to attest to the authenticity of the certificate implicitly by the authentication procedure if the network authentication uses the technique of platform validation whereby the secret key used for authentication to the enrollment entity is released when the secure environment of the RN platform is established.

Alternatively, the network may generate the secure channel key pair and/or transport the secure channel key after successful autonomous validation and/or authentication. With autonomous validation, if the network authentication fails the certificate may not be trusted. Instead of autonomous validation, the secure environment may sign the secure channel certificate when it sends the certificate to the network for enrollment. In that way the management authentication procedure may not be bound to the secure channel procedure directly, but both may be bound to the successful establishment of the secure environment.

Figure 7:
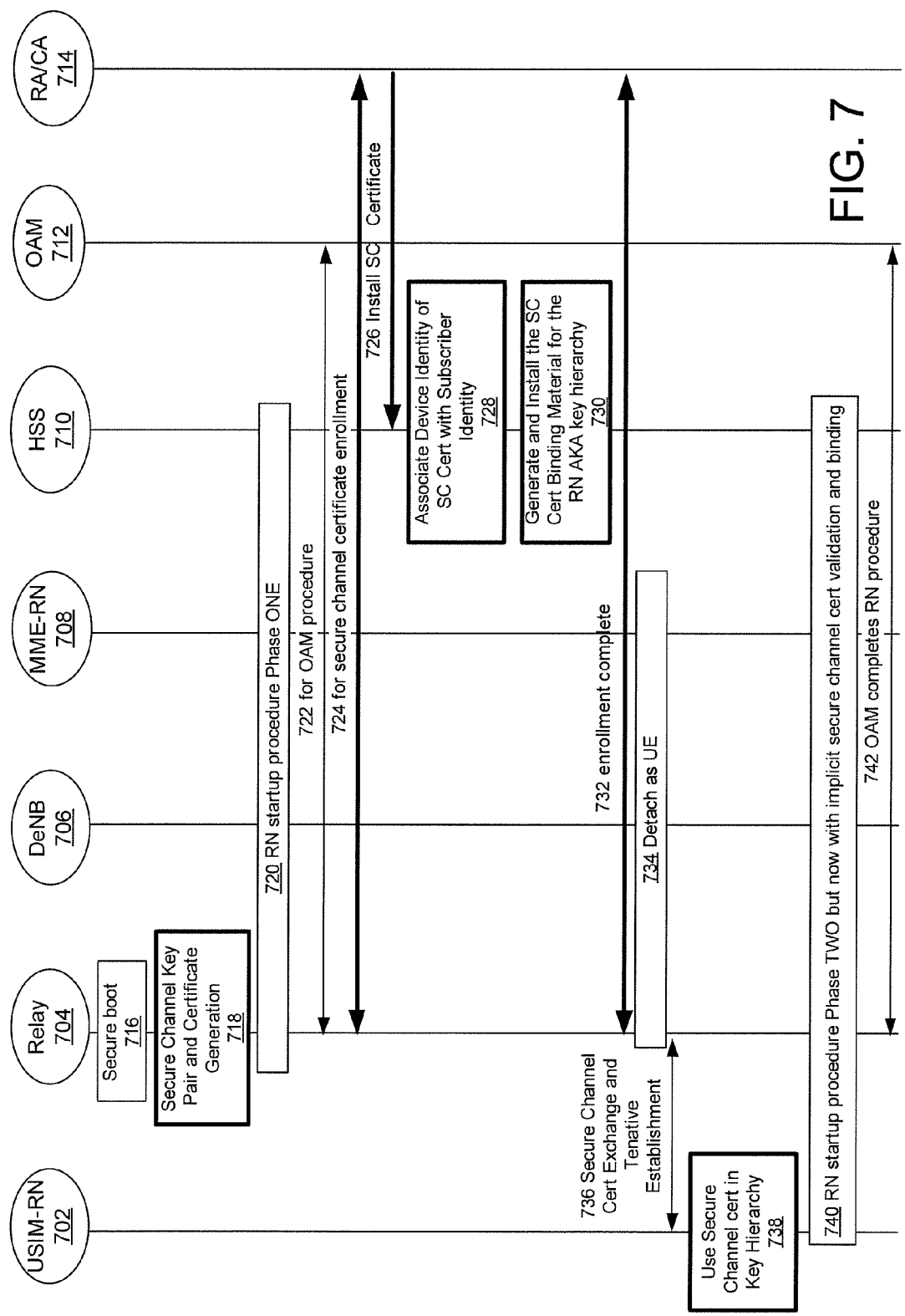
FIG. 7 is a diagram illustrating a relay startup procedure with secure channel enrollment.

FIG. 7 is a diagram that illustrates a relay startup procedure with secure channel enrollment. As illustrated in FIG. 7, the startup phase of the relay node may include secure channel certificate validation. At 716, relay 704 may perform a secure boot. Relay 704 may perform a secure channel key pair and certificate generation at 718. At 720, relay 704 may perform phase one of a startup procedure, such as the phase one startup procedure illustrated at 601-606 in FIG. 6 for example. After phase one of the startup procedure, relay 704 and OAM 712 may perform an OAM procedure at 722. At 724, relay 704 and RA/CA 714 may perform secure channel certificate enrollment. RA/CA 714 may install a secure channel certificate on HSS 710 at 726. At 728, HSS 710 may associate a device identity of the secure channel certificate with a subscriber identity. HSS 710 may also generate and install the secure channel certificate binding material for the RN AKA key hierarchy at 730. Enrollment may complete between relay 704 and RA/CA 714 at 732. At 734, relay 704 may detach as a UE. Relay 704 and USIM-RN 702 may exchange the secure channel certificate at 736 and perform a tentative establishment of the secure channel. USIM-RN 702 may use the secure channel certificate in its key hierarchy at 738. At 740, phase two of the relay 704 startup may be performed, such as the phase two relay startup illustrated at 607-613 in FIG. 6 for example. The phase two relay startup at 740 may be performed with implicit secure channel certificate validation and binding. At 742, the OAM 712 may complete the RN procedure.

According to an embodiment, an alternative for RN platform specific key derivation may be used. For example, in the secure channel binding key the input parameters for the key derivation function may be as described herein. This may be based on the GBA key derivation function, as described in TS 33.220 for example, but with modifications to the P0, P3 and L0, L3 fields as a means to differentiate the field and/or to specifically bind the resulting keys to the secure channel: FC=0x01, P1=RAND, L1=length of RAND is 16 octets (i.e. 0x00 0x10), P2=IMPI encoded to an octet string using UTF-8 encoding, L2=length of IMPI is variable (not greater than 65535), P3=RN platform secure channel certificate or hash of certificate, L3=length of secure channel certificate or hash is variable (not greater than 65535), P0="rn_sc" (i.e. 0x720x6e 0x5f 0x73 0x63), and/or L0=length of P0 is 5 octets (i.e., 0x00 0x05).

The key to be used in key derivation may be: Ks (i.e., CK||IK concatenated), as specified in clauses 4 and 5 of TS 33.220 for example. In TS 33.220, this function may be denoted as: Ks_rn_sc=KDF (Ks, "rn_sc", RAND, IMPI, RN_PLAT_SC_CERT).

An RN platform attachment request may also be performed, as described herein for example. The HSS may know to include the RN-specific parameters, including the secure channel certificate parameter for example, because of an indication in the RN platform initial request message in a NAS transport message. The RN may also attach with an RN-specific indicator information. The MME may subsequently request authentication vectors appropriate for the RN-specific contexts that may include the secure channel certificate parameter.

The authentication sequence may pass or fail. Upon passing the authentication sequence, a key hierarchy, such as the key hierarchy illustrated in FIG. 2 for example, may be used. The $K_{eNB}$ for derivation (RRC integrity and confidentiality, PDCP confidentiality, and PDCP integrity when using enhanced PDCP) in that key hierarchy may be passed to the DeNB to allow for AS security association establishment between the RN platform and/or the DeNB. Likewise the UICC may derive its $K_{eNB}$-based keys according to the same, or similar, hierarchy. These keys may match for secure communication between the RN, MME, and/or DeNB. For example, the keys may match if all parameters, UICC, and/or HSS keys matched based on the USIM-RN root key and the corresponding HSS root key for the UICC identity and/or if the secure channel certificates match. If AKA fails, then the XRES may fail matching and this may be indicated to the RN platform.

The RN platform may send to the network the certificate that it has previously sent to the UICC. This procedure may not be the same as the certificate enrollment phase. This certificate may be sent in the first phase of the startup procedure when IP attachment is allowed. This information may be stored in the HSS with the enrolled and/or validated certificate (or hash thereof) and/or compared to provide the possible cause for rejection (e.g., if the XRES does not pass). However, this certificate provided by the RN platform may not be formally enrolled or validated by a certificate authority, but may be used for informational purposes. It may be used, for example, by the network to ascertain that the certificate given to the UICC and the one enrolled in the HSS do not match and that this may be the cause for authentication failure that may have taken place. This informational certificate may not be used for the actual authentication since the procedure to deliver and/or handle this informational certificate may be lightweight in terms of security. The formally enrolled certificate and/or the one exchanged with the UICC may be the one used for authentication.

The secure channel certificate the UICC receives from the RN platform may be the one it uses to establish the secure channel. The encryption and/or authentication key the UICC uses may be embedded in the certificate. Therefore the certificate received by the UICC may be bound the secure channel and/or the AKA procedure, which may help defeat attacks to switch the certificate. If the RN platform gives the UICC the wrong certificate then the AKA may fail. The network may not use the certificate (which may have been bound to the RN platform) that is subsequently used to establish a secure channel.

The AKA credentials sent over the secure channel may be vulnerable if the secure channel is invalid (meaning the UICC may establish a secure channel with the RN platform using the invalid credentials). The AKA may fail in this case so exposure of the AKA credentials may not be an issue.

If the UICC establishes a secure channel with the RN platform using valid credentials, the AKA credentials may be genuinely protected and/or the AKA procedure may pass, or at least not fail, due to mismatched certificates since the HSS and UICC secure channel certificates match.

Figure 8:
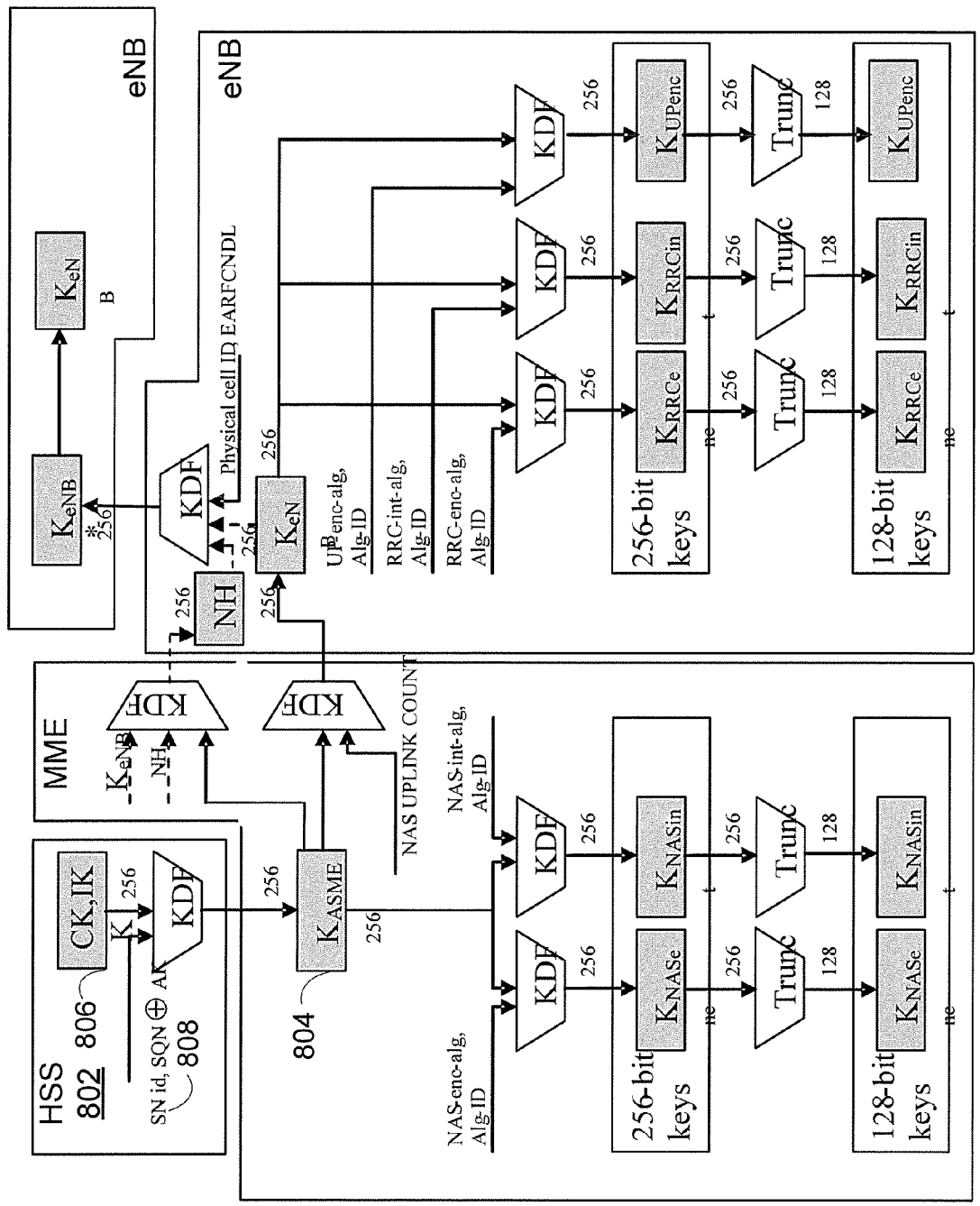
FIG. 8 illustrates a key distribution and key derivation for EPS.

FIG. 8 illustrates a key distribution and key derivation scheme for EPS (in particular E-UTRAN) for network nodes. As shown in FIG. 8, $K_{ASME}$ 804 may be derived from CK, IK 806 and SN id 808 on the HSS 802, such as when producing authentication vectors for example.

Figure 9:
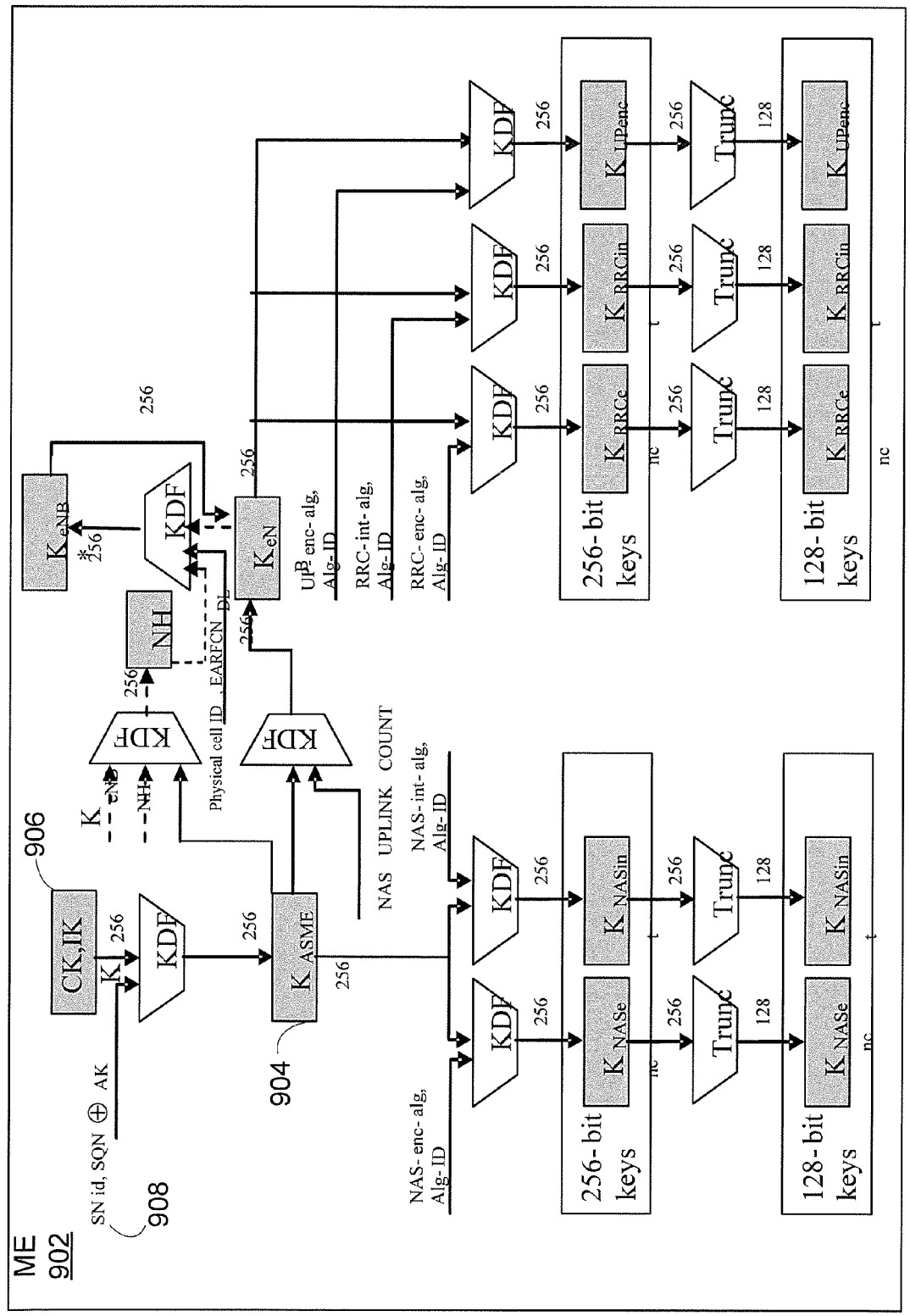
FIG. 9 illustrates a key derivation for EPS.

FIG. 9 illustrates a key derivation for EPS (in particular E-UTRAN) for the ME. As shown in FIG. 9, $K_{ASME}$ 904 may be derived on the ME 902 from CK, IK 906 and SN id 908, such as during the AKA procedure for example.

Figure 10:
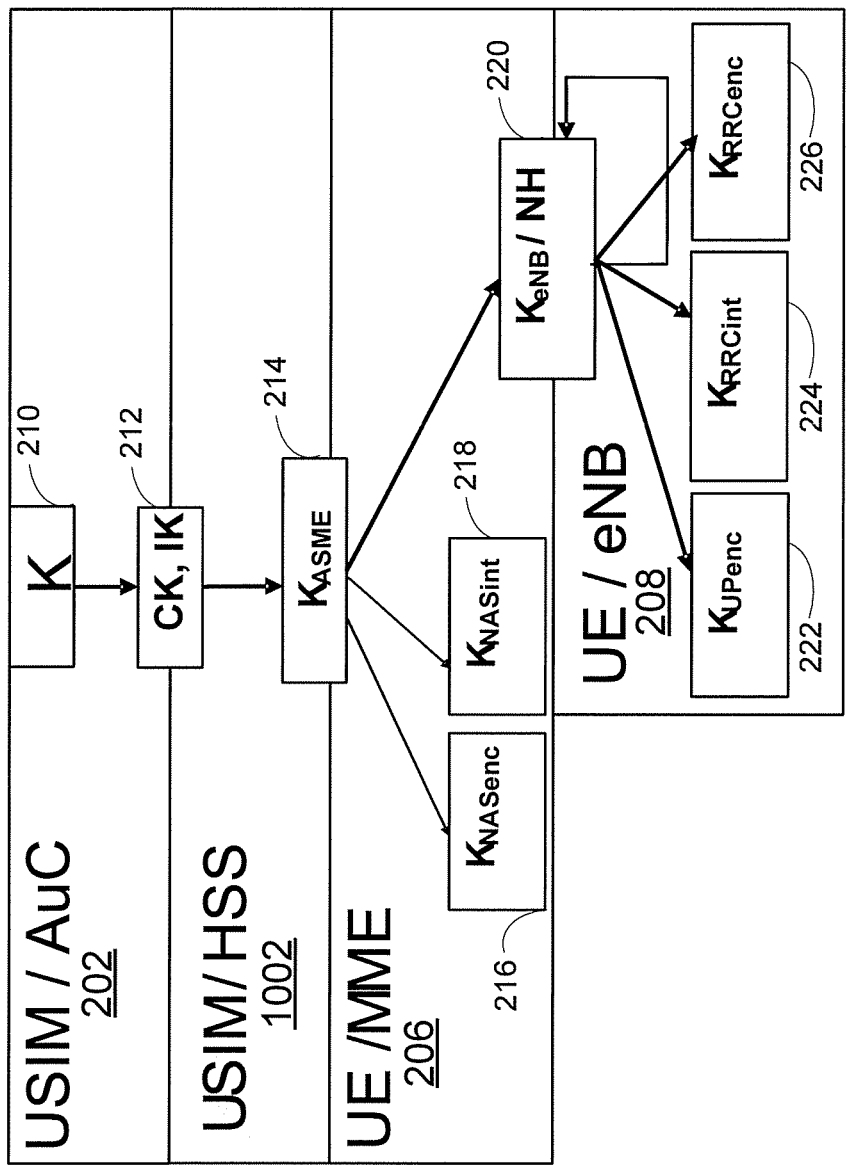
FIG. 10 illustrates an exemplary derivation of $K_{ASME}$ on the USIM.

FIG. 10 illustrates an example embodiment of another key generation and hierarchy. The key generation and hierarchy may be for 3GPP eNBs, for example, in which a $K_{ASME}$ derivation may be performed on a USIM or other constrained network entity. The key generation and hierarchy illustrated in FIG. 10 may be similar to the key generation and hierarchy illustrated in FIG. 2, except as shown in FIG. 10 the $K_{ASME}$ 214 may be generated on the USIM and/or HSS 1002.

Figure 11:
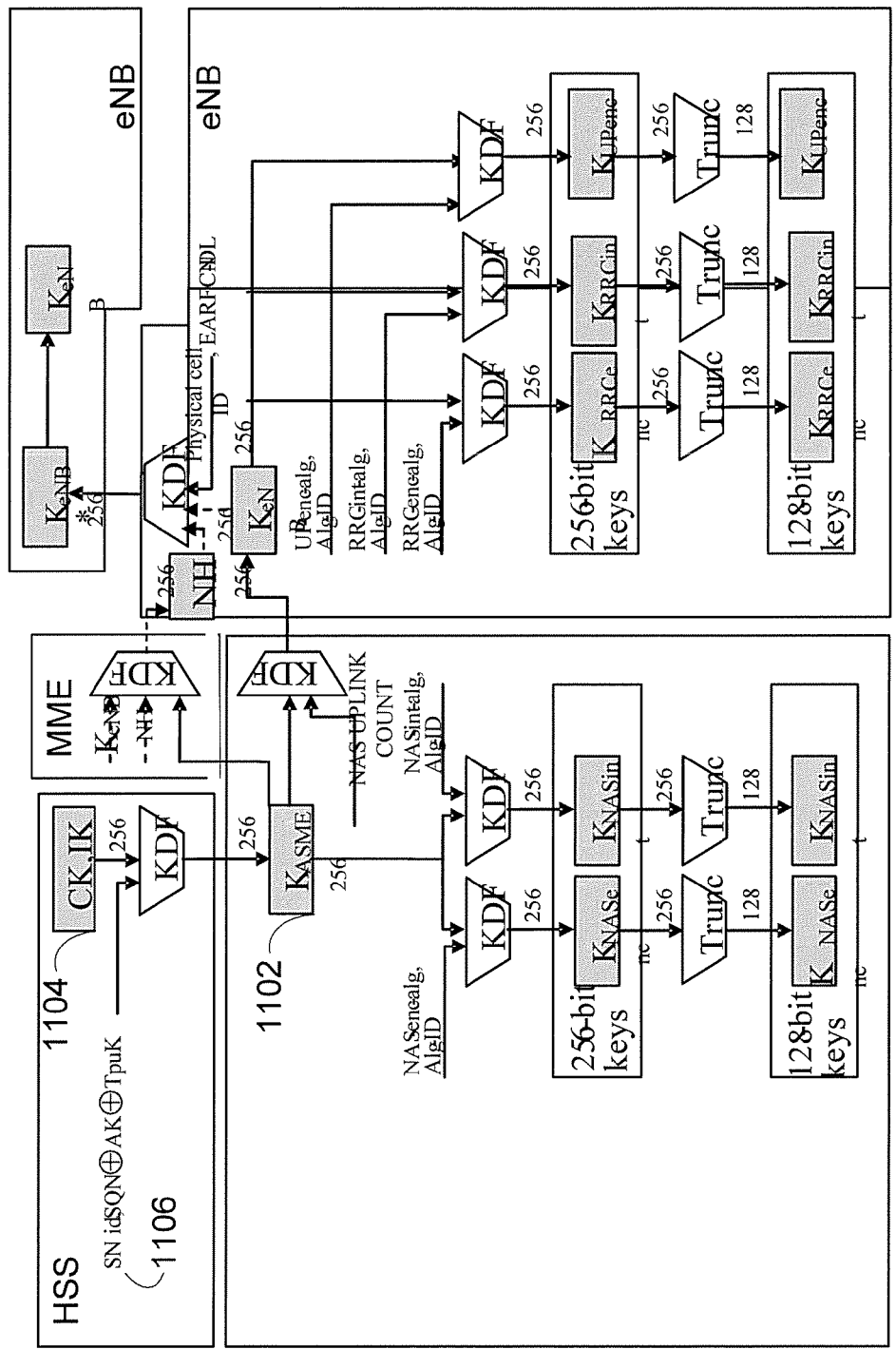
FIG. 11 illustrates an exemplary use of TpuK as a parameter to derive $K_{ASME}$.

FIG. 11 illustrates an exemplary use of TpuK as a parameter to derive $K_{ASME}$. When deriving a $K_{ASME}$ 1102 from CK, IK 1104 and an SN id 1106 when producing authentication vectors the following parameters may be used to form the input S to the KDF: FC=0x10; P0=SN id; L0=length of SN id (i.e. 0x00 0x03); P1=SQN⊕AK⊕TpuK (where TpuK is the terminal valid public key in the core network and the assumed Terminal valid public key in the UICC); and/or L1=length of SQN⊕AK (i.e. 0x00 0x06).

The exclusive OR of the Sequence Number (SQN) and the Anonymity Key (AK) may be sent to the UE as a part of the Authentication Token (AUTN), as described at TS 33.102 for example. If AK is not used, AK may be treated as described in TS 33.102 for example, i.e. as 000 . . . 0.

The SN id may comprise MCC and MNC, and may be encoded as an octet string according to Table 1.

TABLE 1

Encoding of SN id as an octet string

| 8 | 7 | 6 | 5 | 4 | 3 | 2 | 1 | |
|---|---|---|---|---|---|---|---|---|
| MCC digit 2 | | | | MCC digit 1 | | | | octet 1 |
| MNC digit 3 | | | | MCC digit 3 | | | | octet 2 |
| MNC digit 2 | | | | MNC digit 1 | | | | octet 3 |

The coding of the digits of MCC and MNC may be performed according to TS 24.301. The input key may be equal to the concatenation CK∥IK of CK and IK.

Figure 12:
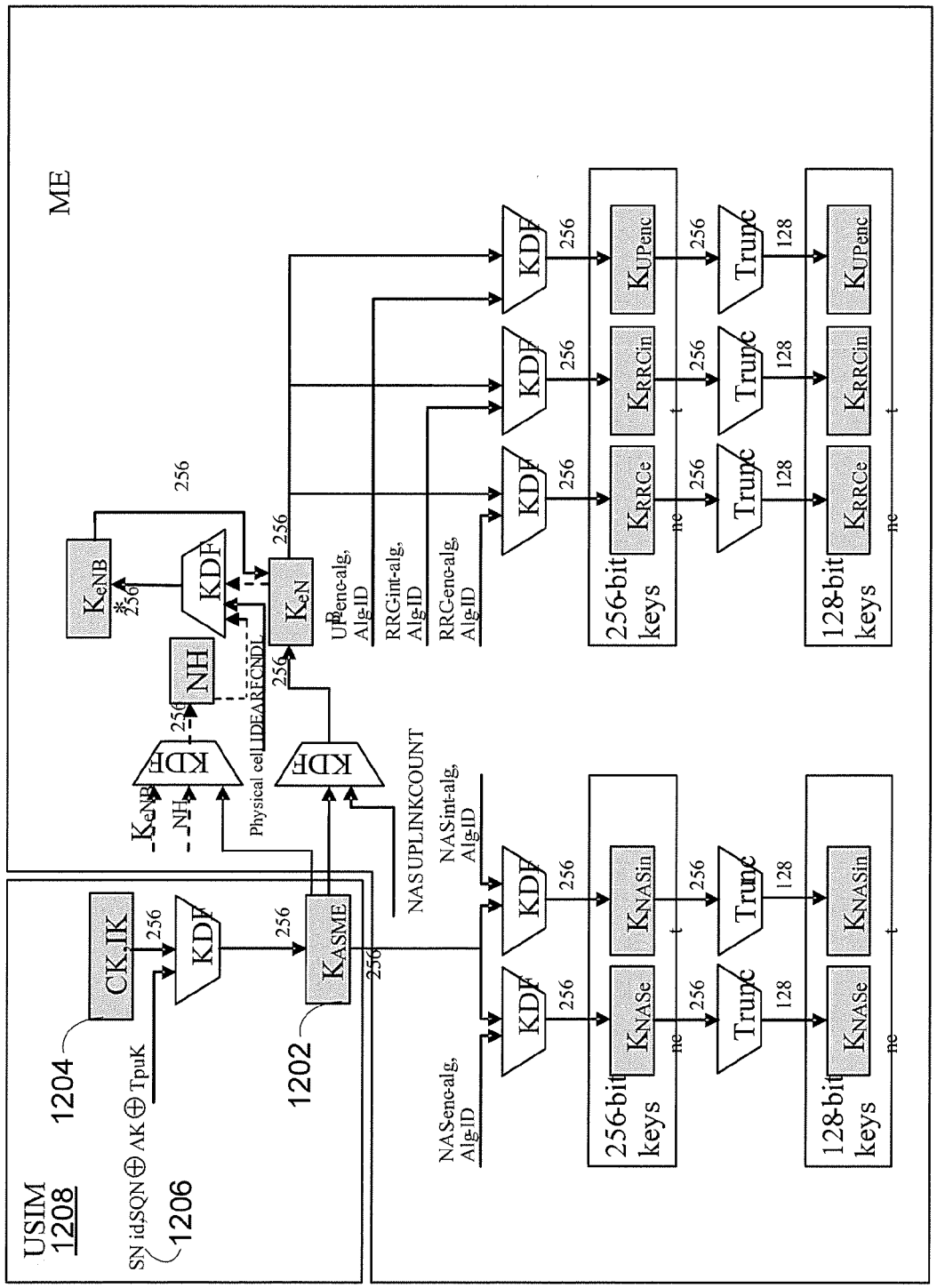
FIG. 12 illustrates an exemplary use of TpuK to derive the key on the USIM.

FIG. 12 illustrates an exemplary use of TpuK to derive the key on the USIM. When deriving a $K_{ASME}$ 1202 from CK, IK 1204 and SN id 1206 on the USIM 1208 during the AKA procedure, the following parameters may be used to form the input S to the KDF: FC=0x10; P0=SN id; L0=length of SN id (i.e., 0x00 0x03); P1=SQN⊕AK⊕TpuK (where TpuK is the terminal valid public key in the core network and the assumed Terminal valid public key in the UICC); and/or L1=length of SQN⊕AK (i.e., 0x00 0x06).

Figure 13:
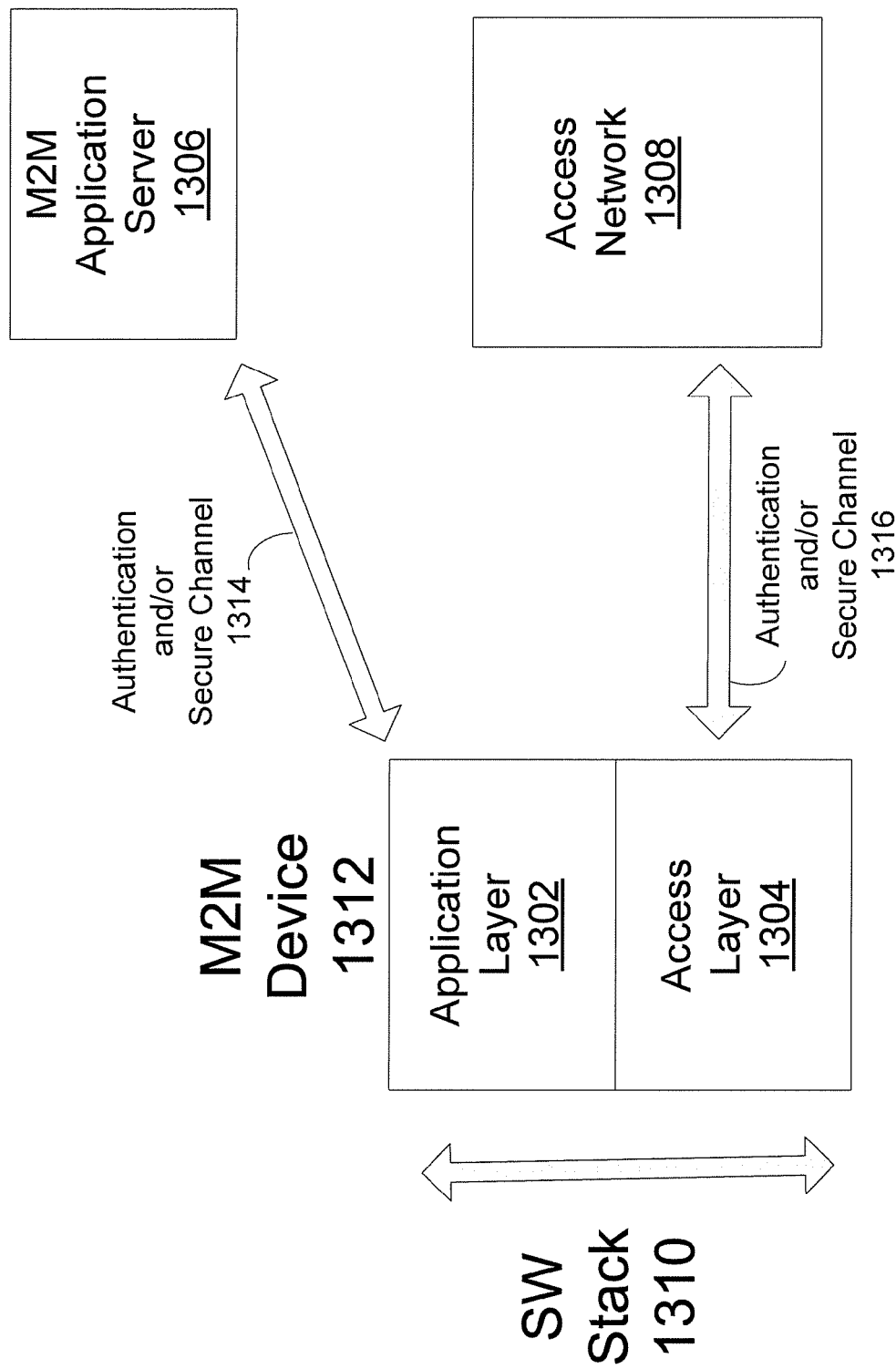
FIG. 13 is a diagram illustrating a machine-to-machine (M2M) device authentication and/or establishing of a secure channel with an M2M access network and an M2M application server.

FIG. 13 is a diagram illustrating authentication and establishment of a secure channel in an M2M network. The authentication and establishment of a secure channel may be established between M2M network entities using the embodiments described herein. As illustrated in FIG. 13, the M2M network may include an M2M device 1312, an M2M application server 1306, and/or an access network 1308. The M2M device 1312 may include a software stack 1310 comprising application layer 1302 and access layer 1304. The M2M access layer 1304 may perform authentication and/or establishment of a secure channel, as described herein, with the M2M access network 1308 at 1316. The application layer 1302 may also perform a separate authentication and/or establishment of a secure channel at 1314 with M2M Application Server 1306. According to one example embodiment, the M2M access layer 1304 network connection, authentication, and/or secure channel may be established prior to the M2M application layer 1302 authentication. The application layer 1302 authentication may be performed based upon the exchange of certificates and the M2M device 1312 may be constrained and thus unable to perform certificate validation. In one embodiment, the validation of the M2M application server 1306 certificate may be carried out by the access network 1308 on behalf of the M2M application layer 1302.

The authentication and secure channel association procedures of the M2M application layer 1302 may be bound to a successful device integrity validation which may include the secure environment and/or components of the M2M device 1312 that may be used for secure operation of the M2M device 1312 communications with the access network 1308 and/or the application server 1306, thus providing the M2M application server 1306 assurances of the security of the platform and M2M application layer 1302 on the M2M device 1312.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:

receiving, at a constrained network entity, a certificate associated with a network entity, wherein the certificate is received for establishing a secure channel between the constrained network entity and the network entity;

establishing, at the constrained network entity, a tentative secure channel with the network entity, wherein the tentative secure channel is established using, at least in part, a public key of the network entity;

sending, by the constrained network entity to a core network entity, the received certificate associated with the network entity to determine the validity of the received certificate, whereby the constrained network entity uses the core network entity as a proxy to validate the certificate;

performing authentication with the core network entity using, at least in part, the public key of the network entity; and receiving, at the constrained network entity from the core network entity, an indication of the validity of the certificate based on an analysis by the core network entity of the certificate, wherein prior to the received indication of validity of the certificate the validity of the certificate was unknown by the constrained network entity.

2. The method of claim 1, wherein the secure channel is established between the network entity and the constrained network entity after successful authentication between the network entity and the constrained network entity.

3. The method of claim 1, wherein the network entity is at least one of a terminal or an M2M network entity.

4. The method of claim 1, wherein the network entity comprises a relay node.

5. The method of claim 1, wherein the constrained network entity is at least one of a UICC or a USIM.

6. The method of claim 1, wherein the indication of the validity of the certificate comprises a result of the authentication between the constrained network entity and the core network entity.

7. The method of claim 6, wherein the result of the authentication comprises an authentication failure when the certificate is invalid.

8. The method of claim 6, wherein the result of the authentication comprises a successful authentication when the certificate is valid.

9. The method of claim 1, wherein the certificate is received during a public key exchange performed to establish the secure channel between the network entity and the constrained network entity.

10. The method recited in claim 1, wherein the authentication is performed in accordance with an Authentication and Key Agreement (AKA) procedure.

11. A method performed by a core network entity of a communications network, the method comprising:
   receiving, from a constrained network entity, a certificate associated with a network entity with which the constrained network entity is attempting to establish a secure channel;
   serving as a proxy for the constrained network entity to determine a validity of the certificate associated with the network entity based on an analysis of the certificate;
   performing authentication with the constrained network entity using, at least in part, a public key of the network entity; and
   indicating, to the constrained network entity, the validity of the certificate to enable establishment of the secure channel between the constrained network entity and the network entity.

12. The method of claim 11, wherein determining the validity of the certificate associated with the network entity further comprises:

sending the certificate to a certificate authority to determine the validity of the certificate; and
   receiving, from the certificate authority, an indication of the validity of the certificate.

13. The method of claim 11, wherein the constrained network entity uses an identity of the network entity to obtain a known valid certificate associated with the identity; and
   further comprising comparing the known valid certificate to the certificate associated with the network entity to determine the validity of the certificate associated with the network entity.

14. The method of claim 11, further comprising sending a revocation status of the certificate to the constrained network entity to indicate that the certificate is invalid.

15. The method of claim 11, wherein the network entity comprises a relay node and the constrained network comprises a UICC.

16. The method recited in claim 11, wherein the authentication is performed in accordance with an Authentication and Key Agreement (AKA) procedure.

17. A constrained network entity configured to:
   receive a certificate associated with a network entity and a public key associated with the network entity, wherein the certificate and the public key are received for establishing a secure communication channel between the constrained network entity and the network entity;
   send, to a core network entity with which the constrained network entity has an established security association, the certificate, whereby the constrained network entity uses the core network entity as a proxy to validate the certificate;
   perform authentication with the core network entity using, at least in part, the public key of the network entity; and
   receive, from the core network entity, an indication of the validity of the certificate based on an analysis of the certificate by the core network entity, wherein prior to the received indication of validity of the certificate the validity of the certificate was unknown by the constrained network entity.

18. The constrained network entity of claim 17, wherein the network entity is at least one of a terminal or an M2M network entity.

19. The constrained network entity of claim 17, wherein the constrained network entity is a UICC or a USIM.

20. The constrained network entity of claim 17, wherein authentication is performed in accordance with an Authentication and Key Agreement (AKA) procedure.

* * * * *